United States Patent
Hesler et al.

(10) Patent No.: US 11,291,216 B2
(45) Date of Patent: *Apr. 5, 2022

(54) BASE EMULSION FOR THE PREPARATION OF ICINGS, FILLINGS AND TOPPINGS

(71) Applicant: CSM Bakery Solutions Europe Holding B.V., Amsterdam (NL)

(72) Inventors: William Michael Hesler, Lilburn, GA (US); Orelia Elizabeth Dann, Decatur, GA (US); Andrew Richard Hart, Dunwoody, GA (US)

(73) Assignee: BRILL, INC., Tucker, GA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/323,223

(22) PCT Filed: Aug. 3, 2017

(86) PCT No.: PCT/EP2017/069643
§ 371 (c)(1),
(2) Date: Feb. 4, 2019

(87) PCT Pub. No.: WO2018/024823
PCT Pub. Date: Feb. 8, 2018

(65) Prior Publication Data
US 2019/0200634 A1  Jul. 4, 2019

Related U.S. Application Data

(60) Provisional application No. 62/371,501, filed on Aug. 5, 2016.

(51) Int. Cl.
| | | |
|---|---|---|
| *A23D 7/005* | (2006.01) | |
| *A21D 13/28* | (2017.01) | |
| *A21D 13/38* | (2017.01) | |
| *A23G 3/54* | (2006.01) | |
| *A23G 3/42* | (2006.01) | |
| *A23G 3/34* | (2006.01) | |
| *A23G 3/52* | (2006.01) | |
| *A21D 13/30* | (2017.01) | |
| *A21D 13/40* | (2017.01) | |
| *A23C 13/12* | (2006.01) | |

(52) U.S. Cl.
CPC .......... *A23D 7/0053* (2013.01); *A21D 13/28* (2017.01); *A21D 13/30* (2017.01); *A21D 13/38* (2017.01); *A21D 13/40* (2017.01); *A23C 13/12* (2013.01); *A23G 3/343* (2013.01); *A23G 3/346* (2013.01); *A23G 3/42* (2013.01); *A23G 3/52* (2013.01); *A23G 3/54* (2013.01); *A23G 2200/06* (2013.01); *A23V 2002/00* (2013.01); *A23V 2250/5112* (2013.01); *A23V 2250/5118* (2013.01)

(58) Field of Classification Search
CPC ........ A23D 7/0053; A23G 3/343; A23G 3/54; A23V 2250/5112; A23V 2250/5118; A23V 2002/00; A21D 13/28; A21D 13/38

USPC ........................................................ 426/602
See application file for complete search history.

(56) References Cited

U.S. PATENT DOCUMENTS

| | | |
|---|---|---|
| 4,711,788 A | 12/1987 | Porcello et al. |
| 5,102,680 A | 4/1992 | Glass et al. |
| 5,962,058 A | 10/1999 | Ono et al. |
| 6,203,841 B1 | 3/2001 | Lynch et al. |
| 9,756,868 B2 | 9/2017 | Hesler et al. |
| 2007/0003681 A1 | 1/2007 | Kim |
| 2007/0178209 A1 | 8/2007 | Bialek et al. |
| 2008/0069924 A1 | 3/2008 | Zeller et al. |
| 2008/0131576 A1 | 6/2008 | Perks et al. |
| 2014/0154377 A1 | 6/2014 | Wang-Nolan et al. |
| 2018/0035678 A1 | 2/2018 | Hesler et al. |
| 2018/0035691 A1 | 2/2018 | Hesler et al. |

FOREIGN PATENT DOCUMENTS

| | | |
|---|---|---|
| EP | 1 477 072 A1 | 11/2004 |
| EP | 1738650 A1 | 1/2007 |
| JP | S63-248433 A | 10/1988 |
| JP | H03-187340 A | 8/1991 |
| JP | H06-269256 A | 9/1994 |
| JP | 2010-022305 A | 2/2010 |
| JP | 2015-047117 A | 3/2015 |
| WO | WO-98/31236 | 7/1998 |
| WO | WO-02/19840 | 3/2002 |

(Continued)

OTHER PUBLICATIONS

"Baked Alaska", available from saveur.com as of Jan. 21, 2014, pp. 1-3 (3 pages).
"Nutrient Content of Milk Varieties", available online from www.milkfacts.info as of May 26, 2015, pp. 1-13 (13 pages).
"Stabilizers, naturally", available online Oct. 1, 2007 from www.naturalproductsinsider.com, pp. 1-8 (8 pages).
"Stabilizing oil-in-water emulsions with cyclodextrins", available online from www.wacker.com as of Nov. 3, 2012, pp. 1-3 (3 pages).
"Typical fatty-acid compositions of some common fats", adapted from Gunstone, F. Fatty acid and Lipid chemistry; Blackie: London, 1996, pp. 1-2 (2 pages).
"Vegetarian-grade stabilizer for novel food applications", available online from www.foodproductdesign.com as of Jul. 15, 2013, pp. 1-2 (2 pages).
"Whipped Cream Cake", From the Kitchen of Rose, available online as of Jan. 22, 2010 from www.rrealbakingwithrose.com, pp. 1-33.

(Continued)

*Primary Examiner* — Jyoti Chawla
(74) *Attorney, Agent, or Firm* — Foley & Lardner LLP

(57) ABSTRACT

The invention relates to an oil-and-water emulsion comprising an aqueous phase and an oil phase, said emulsion containing: —15-40 wt. % water; —30-60 wt. % oil; —1.5-18 wt. % of cyclodextrin selected from alpha-cyclodextrin, beta-cyclodextrin and combinations thereof; —12-50 wt. % of saccharides selected from monosaccharides, disaccharides, non-cyclic oligosaccharides, sugar alcohols and combinations thereof. The emulsions according to the present invention are highly stable under ambient conditions, can easily be used as a base for the manufacture of a variety of icings, fillings and toppings. These base emulsions can suitably be aerated (creamed) to produce a creamed icing or filling, or a whipped topping that has excellent ambient temperature stability.

24 Claims, No Drawings

(56) References Cited

FOREIGN PATENT DOCUMENTS

WO  WO-2013/075939 A1  5/2013
WO  WO-2016/126161 A1  8/2016

OTHER PUBLICATIONS

Hashimoto, "Cyclodextrins in Foods, Cosmetics, and Toiletries", Comprehensice Supra-Molecular Chemi, vol. 3, pp. 483-502, Jan. 1, 1996.
Wacker, "Cavamax—The Emulsigying Dietary Fiber", Mar. 19, 2015.
Wacker, "New Possibilities for Aerated Confectionery Filings", Mar. 19, 2015.
International Search Report issued in PCT/EP2017/069638, dated Oct. 23, 2017.
Written Opinion of the International Searching Authority issued in PCT/EP2017/069638, dated Oct. 23, 2017.
International Search Report issued in PCT/EP2017/069643, dated Oct. 20, 2017.
Written Opinion of the International Searching Authority issued in PCT/EP2017/069643, dated Oct. 20, 2017.
Bhattacharya S., "Hydrocolloids as thickening and gelling agents in food: a critical review", Journal of Food Science Technology, Nov.-Dec. 2010, vol. 46(6): pp. 587-597.
Lundberg et al., "Rheology and composition of citrus fiber", Mar. 2014, Journal of Food Engineering, vol. 125, pp. 97-104.
Tereos, "Low DE Maltodextrin", 2016 (Year: 2016).
Barbosa-Canovas et al., "Water Activity in Foods: Fundamentals and Applications", 2007, pp. 239-271 ad 407-420.

BASE EMULSION FOR THE PREPARATION OF ICINGS, FILLINGS AND TOPPINGS

CROSS-REFERENCE TO RELATED APPLICATIONS

This application is the National Phase of International Patent Application No. PCT/EP2017/069643, filed Aug. 3, 2017, published on Feb. 8, 2018 as WO/2018/024823A1, which claims priority to U.S. Provisional Application Ser. No. 62/371,501, filed Aug. 5, 2016. The contents of these applications are herein incorporated by reference in their entirety.

TECHNICAL FIELD OF THE INVENTION

The present invention relates to an oil-and-water emulsion that can be used as a base for the preparation of icings, fillings and toppings, such as buttercream.

The oil-and-water emulsion according to the present invention comprises an aqueous phase and an oil phase, said emulsion containing:
- 15-40 wt. % water;
- 30-60 wt. % oil;
- 1.5-18 wt. % of cyclodextrin selected from alpha-cyclodextrin, beta-cyclodextrin and combinations thereof;
- 12-50 wt. % of saccharides selected from monosaccharides, disaccharides, non-cyclic oligosaccharides, sugar alcohols and combinations thereof.

The emulsions of the present invention are very stable under ambient conditions and can conveniently be used in the preparation of a wide range of icings, fillings and toppings.

BACKGROUND OF THE INVENTION

Icing, often called frosting in the United States, is a sweet, often creamy glaze made of sugar with a liquid, such as water or milk, that is often enriched with ingredients like butter, egg whites, cream cheese, or flavorings. It is used to cover or decorate baked goods, such as cakes or cookies. When it is used between layers of cake, it is called filling.

The simplest icing is a glace icing, containing powdered sugar and water. This can be flavored and colored as desired, for example, by using lemon juice in place of the water. More complicated icings can be made by beating fat into powdered sugar (as in buttercream), by melting fat and sugar together, by using egg whites (as in royal icing), and by adding other ingredients such as glycerin (as in fondant).

Icing can be applied with a utensil such as a knife or spatula, or it can be applied by drizzling or dipping (see glaze), or by rolling the icing out and draping it over the cake. The method of application largely depends on the type and texture of icing being used. Icing may be used between layers in a cake as a filling, or it may be used to completely or partially cover the outside of a cake or other baked product.

Cyclodextrins are a family of cyclic oligosaccharides that are produced from starch by means of enzymatic conversion. Cyclodextrins are composed of 5 or more α-(1,4) linked D-glucopyranoside units, as in amylose (a fragment of starch). Typical cyclodextrins contain a number of glucose monomers ranging from six to eight units in a ring, creating a cone shape:
- α (alpha)-cyclodextrin: 6-membered sugar ring molecule
- β (beta)-cyclodextrin: 7-membered sugar ring molecule
- γ (gamma)-cyclodextrin: 8-membered sugar ring molecule Because cyclodextrins have a hydrophobic inside and a hydrophilic outside, they can form complexes with hydrophobic compounds. Thus, they can enhance the water solubility and bioavailability of such compounds. This is of high interest for pharmaceutical as well as dietary supplement applications in which hydrophobic compounds shall be delivered. Alpha-, beta-, and gamma-cyclodextrin are all generally recognized as safe by the FDA.

The application of cyclodextrins in oil-in-water emulsions has been described in patent publications.

US 2007/0003681 describes aerated food compositions containing protein, oil and cyclodextrin. The cyclodextrin is said to enable generation of a more stable and greater overrun protein-stabilized foam in the presence of liquid oils as compared to oil-containing food products lacking the cyclodextrin. The patent examples describe an ice cream containing skim milk (56.1 wt. %), canola oil (19.6 wt. %), sugar (17.4 wt. %), alpha cyclodextrin (6.5 wt. %) and vanilla extract (0.4 wt. %).

US 2008/0069924 describes a gasified food product comprising an alpha-cyclodextrin-gas clathrate. Food products mentioned in the US patent application are a dry mix, a liquid solution, a dough, a batter, a baked product, a ready-to-eat product, a ready-to-heat product, a liquid concentrate, a beverage, a frozen beverage, and a frozen product.

WO 2013/075939 describes a food composition comprising: a food base having a base carbohydrate-to-protein (base C/P) ratio and a base carbohydrate-to-fat (base C/F) ratio, at least one of the base C/P and C/F ratios being greater than 1; and cyclodextrin mixed with the food base to form the food composition with a volume increase of 15 percent or greater relative to a comparable control composition without the cyclodextrin.

SUMMARY OF THE INVENTION

The inventors have developed oil-and-water emulsions that can suitably be used as a base in the preparation of icings, fillings and toppings. Typically, the emulsions maintain a rheology similar to shortening although pourable compositions of the same are possible. Surprisingly, the base emulsion of the present invention does not exhibit melt characteristics of the oil(s) used to make it but rather the base emulsion maintains its structure even at 200 above the melting point of the oil it contains. The base emulsion may be viscous and pourable or it may be solid and plastic in consistency.

The oil-and-water emulsion of the present invention comprises an aqueous phase and an oil phase, said emulsion containing:
- 15-40 wt. % water;
- 30-60 wt. % oil;
- 1.5-18 wt. % of cyclodextrin selected from alpha-cyclodextrin, beta-cyclodextrin and combinations thereof;
- 12-50 wt. % of saccharides selected from monosaccharides, disaccharides, non-cyclic oligosaccharides, sugar alcohols and combinations thereof.

The emulsions according to the present invention are highly stable under ambient conditions, can easily be used as a base for the manufacture of a variety of icings, fillings and toppings. These base emulsions can suitably be aerated (creamed) to produce a creamed icing or filling, or a whipped topping that has excellent ambient temperature stability.

DETAILED DESCRIPTION OF THE INVENTION

Accordingly, a first aspect of the invention relates to an oil-and-water emulsion comprising an aqueous phase and an oil phase, said emulsion containing:
- 15-40 wt. % water;
- 30-60 wt. % oil;
- 1.5-18 wt. % of cyclodextrin selected from alpha-cyclodextrin, beta-cyclodextrin and combinations thereof;
- 12-50 wt. % of saccharides selected from monosaccharides, disaccharides, non-cyclic oligosaccharides, sugar alcohols and combinations thereof.

The term "fat" and "oil" as used herein, unless indicated otherwise, refers to lipids selected from triglycerides, diglycerides, monoglycerides, fatty acids, phosphoglycerides and combinations thereof.

The term "alpha cyclodextrin" as used herein refers to a cyclic oligosaccharide of six glucose units that are covalently attached end to end via α-1,4 linkages.

The term "beta-cyclodextrin" as used herein refers to a cyclic oligosaccharide of seven glucose units that are covalently attached end to end via α-1,4 linkages.

The term "oligosaccharide" as used herein refers to a saccharide polymer containing 3 to 9 monosaccharide units.

The term "polysaccharide" as used herein refers to a saccharide polymer containing 10 monosaccharide units or more. The term "polysaccharide" also encompasses modified polysaccharides, such a hydrolysed polysaccharides and chemically modified polysaccharides.

The term "sugar alcohol" as used herein refers to a polyol having the general formula $H(HCHO)_nH$ or $C_6H_{11}O_6$—$CH_2$—$(HCHO)_nH$. Most sugar alcohols have five- or six carbon chains, because they are derived from pentoses (five-carbon sugars) and hexoses (six-carbon sugars), respectively. Other sugar alcohols may be derived from disaccharides and typically contain eleven or twelve carbon atoms. Examples of sugar alcohols containing 12 carbon atoms include mannitol and sorbitol. Erythritol is a naturally occurring sugar alcohol that contains only four carbon atoms.

The term "polysaccharide filler" as used herein refers to polysaccharides selected from hydrolysed starch, starch, inulin and combinations thereof.

The term "polysaccharide viscosifier" as used herein refers to polysaccharides that are not polysaccharide fillers and that are capable of substantially increasing the viscosity of aqueous liquids at low concentration, e.g. in concentrations of less than 5 wt. %.

The polysaccharide filler and the polysaccharide viscosifier may be introduced in the present emulsion in the form of ingredients that contain non-polysaccharide components, such as oligosaccharides, disaccharides and/or monosaccharides. These non-polysaccharide components are not considered to be encompassed by the term "polysaccharide filler" or "polysaccharide filler".

The term "starch" refers to a polysaccharide (glucose polymer) that is produced by most green plants as an energy store. Starch consists of two types of molecules: the linear and helical amylose and the branched amylopectin.

The term "hydrolysed starch" as used herein in refers starch polymers that are obtained by breaking up the parent starch molecule into two or more parts by cleavage of one or more glycosidic bonds. Dextrins and maltodextrins are examples of hydrolysed starches. Dextrins can be produced, for instance, from starch using enzymes like amylases, or by applying dry heat under acidic conditions. Dextrins produced by heat are also known as pyrodextrins. The term "hydrolysed starch" only encompasses polymers containing 10 monosaccharide units or more.

The term "inulin" refers to a group of naturally occurring polysaccharides produced by many types of plants. Inulin is a heterogeneous collection of fructose polymers. It consists of chain-terminating glucosyl moieties and a repetitive fructosyl moiety, which are linked by β(2,1) bonds. The degree of polymerization (DP) of inulin typically ranges from 10 to 60. Inulin is used by some plants as a means of storing energy and is typically found in roots or rhizomes. Most plants that synthesize and store inulin do not store other forms of carbohydrate such as starch.

The term "natural gum" as used herein refers to polysaccharides of natural origin, capable of causing a large increase in a solution's viscosity, even at small concentrations. In the food industry they are used as thickening agents, gelling agents, emulsifying agents, and stabilizers.

Natural gums can be classified uncharged or ionic polymers (polyelectrolytes).

The term "carboxymethyl cellulose" as used herein refers to a cellulose derivative with carboxymethyl groups (—$CH_2$—COOH) bound to some of the hydroxyl groups of the glucopyranose monomers that make up the cellulose backbone.

The term "cellulose fibres" as used herein refers to natural cellulose fibers that have been isolated from plant material. The presence of linear chains of thousands of glucose units allows a great deal of hydrogen bonding between OH groups on adjacent cellulose chains, causing them to pack closely into cellulose fibers.

The term "pectin" as used herein refers to polysaccharides that are rich in galacturonic acid, including:
- Homogalacturonans: linear chains of α-(1-4)-linked D-galacturonic acid.
- Substituted galacturonans, characterized by the presence of saccharide appendant residues (such as D-xylose or D-apiose in the respective cases of xylogalacturonan and apiogalacturonan) branching from a backbone of D-galacturonic acid residues.
- Rhamnogalacturonan I pectins (RG-I) contain a backbone of the repeating disaccharide: 4)-α-D-galacturonic acid-(1,2)-α-L-rhamnose-(1. From many of the rhamnose residues, sidechains of various neutral sugars branch off. The neutral sugars are mainly D-galactose, L-arabinose and D-xylose, with the types and proportions of neutral sugars varying with the origin of pectin.
- Rhamnogalacturonan II (RG-II), a complex, highly branched polysaccharide with a backbone that is made exclusively of D-galacturonic acid units.

The terms "wt. %" and "% by weight" refer to the concentration expressed on a weight-by-weight basis (% (w/w)).

The term "specific gravity" as used herein refers to ratio of the density of an (aerated) emulsion to the density (mass of the same unit volume) of water, both densities being determined at 20° C.

The solid fat content of the oil phase at a particular temperature is determined by measuring the so called N-value at that temperature. The N value at temperature x° C. is referred to in here as $N_x$ and represents the amount of solid fat at a temperature of x° C. These N-values can suitably be measured using the generally accepted analytical method that is based on NMR measurements (AOCS official method Cd 16b-93): Sample pre-treatment involves heating to 80° C. (176° F.) 15 minutes, 15 minutes at 60° C. (140° F.), 60 minutes at 0° C. (32° F.) and 30 minutes at the measuring temperature.

The oil-and-water emulsion of the present invention preferably is an oil-in-water emulsion containing a continuous aqueous phase and a dispersed oil phase.

The aqueous phase of the emulsion typically has a pH in the range of 3.5 to 7.5, more preferably of 4.5 to 7.0 and most preferably of 5.0 to 6.5.

The water content of the emulsion preferably lies in the range of 18-36 wt. %. More preferably, the water content is in the range of 20-34 wt. %, most preferably in the range of 22-32 wt. %.

The oil contained in the present emulsion is preferably selected from vegetable oil, milk fat and combinations thereof. Vegetable oils preferably represent at least at least 50 wt. %, more preferably at least 80 wt. % and most preferably at least 90 wt. % of the oil. Surprisingly, the emulsion of the present invention does not require crystalline fat for stability. Thus, the present invention enables the preparation of stable aerated emulsions that contain a reduced amount of high melting fat, notably fat containing saturated fatty acids (SAFA).

Accordingly, in one embodiment of the invention, the oil present in the emulsion contains not more than 40 wt. %, more preferably not more than 30 wt. % and most preferably not more than 20 wt. % of SAFA, calculated on total amount of fatty acid residues. Examples of low SAFA oils that may be employed include soybean oil, sunflower oil, rapeseed oil (canola oil), cottonseed oil and combinations thereof. Preferably, the oil contains at least 50 wt. %, more preferably at least 70 wt. % and most preferably at least 80 wt. % of vegetable oil selected from soybean oil, sunflower oil, rapeseed oil (canola oil), cottonseed oil, linseed oil, maize oil, safflower oil, olive oil and combinations thereof.

In case the emulsion has a low SAFA content, said emulsion typically has a solid fat content at 20° C. ($N_{20}$) of less than 20%, more preferably of less than 14% and most preferably of less than 8%.

In accordance with another embodiment, the emulsion contains a fat with a high SAFA content. The use of a fat with a high SAFA content offers the advantage that these fats enable the production of icings, toppings and fillings that have very pleasant mouthfeel characteristics due to in-mouth melting of the fat component. Examples of fats with a high SAFA content that may suitably be employed include butter fat, and lauric fats such as coconut oil and palm kernel oil.

Lauric fats offer the advantage that they rapidly melt in the temperature range of 20 to 30° C. and as a result are capable of imparting a cooling sensation when melting in the mouth. These lauric fats may be applied as such, or in the form of a fraction (e.g. a stearin fraction). Also hydrogenated and/or interesterified lauric fats can be applied. Preferably, the oil comprises at least 30 wt. %, more preferably at least 50 wt. % and most preferably at least 70 wt. % of lauric fat.

In case the emulsion contains oil with a high SAFA content, the oil employed in the emulsion typically has a solid fat content at 20° C. ($N_{20}$) of at least 10%, more preferably of at least 20% and most preferably of at least 30%. The solid fat content of the oil in the emulsion preferably has a solid fat content at 35° C. ($N_{35}$) of less than 15%, more preferably of less than 12% and most preferably of less than 8%.

The oil of the present emulsion typically contains at least 80 wt. %, more preferably at least 90 wt. % of triglycerides.

The emulsion of the present invention preferably has an oil content of 35-55 wt. %. More preferably, the oil content is in the range of 36 to 52 wt. %, most preferably in the range of 38 to 51 wt. %.

The saccharides preferably constitute 15-40 wt. %, more preferably 16-35 wt. % and most preferably 17-30 wt. % of the emulsion. Saccharides represent the bulk of the solute present in the aqueous phase and have a significant influence on the viscosity and fluid dynamics of the emulsion.

Monosaccharides preferably represent at least 40 wt. %, more preferably at least 55 wt. %, even more preferably at least 60 wt. % and most preferably at least 70 wt. % of the saccharides contained in the emulsion. Preferably, the emulsion contains 10-30 wt. %, more preferably 12-27 wt. % and most preferably 14-25 wt. % of monosaccharides selected from fructose, glucose and combinations thereof.

The emulsion may suitably contain sugar alcohols. Sugar alcohols that are particularly suitable for use in the emulsion include glycerol, erythritol, xylitol, mannitol, sorbitol, maltitol, lactitol and combinations thereof. Preferably, sugar alcohols are applied in the present emulsion in combination with monosaccharides.

The cyclodextrin employed in accordance with the present invention preferably is alpha-cyclodextrin.

Best results are obtained with the present emulsion if it contains 2-15 wt. % of cyclodextrin.

More preferably, the emulsion contains 2.5-12 wt. % of cyclodextrin, even more preferably 3-10 wt. % of cyclodextrin and most preferably 4-9 wt. % of cyclodextrin.

The cyclodextrin employed in accordance with the present invention preferably is not a cyclodextrin-gas clathrate.

According to a preferred embodiment, the emulsion contains 1-20 wt. % polysaccharides. The polysaccharide content of the present emulsion preferably is in the range of 2-18 wt. %, more preferably in the range of 3-16 wt. % and most preferably in the range of 4-15 wt. %.

The polysaccharides in the present emulsion preferably comprise a polysaccharide component selected from polysaccharide filler, polysaccharide viscosifier and combinations thereof, said polysaccharide filler being selected from hydrolysed starch, starch, inulin and combinations thereof.

According to a particularly preferred embodiment, the emulsion comprises 1-18% by weight of the emulsion of polysaccharide filler. More preferably, the emulsion comprises 2-15 wt. %, most preferably 4-12 wt. % of the polysaccharide filler.

The polysaccharide filler employed in the present emulsion preferably is hydrolysed starch.

Typically, the hydrolysed starch has a dextrose equivalent (DE) in the range of 1 to 20. More preferably, the hydrolysed starch has a DE in the range of 5-18, most preferably in the range of 6-15.

The emulsion typically contains 0.01-5 wt. % of the polysaccharide viscosifier. More preferably, the emulsion contains 0.05-3 wt. % of the polysaccharide viscosifier, most preferably 0.1-2 wt. % of the polysaccharide viscosifier.

Particular good results can be obtained in case the present emulsion contains a combination of the polysaccharide filler and the polysaccharide viscosifier.

Examples of polysaccharide viscosifiers that can be applied in the present emulsion include natural gums, pectins, carboxymethyl cellulose, cellulose fibres and combinations thereof.

In accordance with one embodiment of the present invention, the polysaccharide viscosifier is natural gum. The natural gum used can be a polyelectric natural gum or an uncharged natural gum. Examples of polyelectric natural gums that can suitably be used include gum arabic, gellan gum and combinations thereof. Examples of uncharged natural gum include guar gum, locust bean gum, xanthan gum and combinations thereof. The preferred uncharged natural gum is locust bean gum.

According to a particularly preferred embodiment, the natural gum employed in the present emulsion is selected from gum arabic, locust bean gum and combinations thereof.

In accordance with another embodiment, the polysaccharide viscosifier is pectin.

In accordance with a further embodiment, the polysaccharide viscosifier is carboxymethyl cellulose.

In accordance with yet another embodiment of the present invention, the polysaccharide viscosifier is cellulose fibre. The cellulose fibre employed preferably is defibrillated cellulose fibre. The cellulose fibre used preferably originates from citrus fruit or sugar beet, most preferably from citrus fruit.

The emulsion can suitably contain a variety of other edible ingredients, i.e. edible ingredients other than oil, water, cyclodextrin and saccharides. Examples of other edible ingredients that may suitably be contained in the emulsion include emulsifiers, hydrocolloids, non-saccharide sweeteners, acidulants, preservatives, flavorings, colorings, vitamins, minerals, anti-oxidants, cocoa solids, milk solids, plant extracts, fruit juices, vegetable purees and combinations thereof. Typically, the emulsion contains 0.1-20 wt. %, more preferably 0.2-15 wt. % and most preferably 0.3-10 wt. % of the other edible ingredients.

In accordance with another preferred embodiment of the invention, the emulsion contains 0-3 wt. % of protein. Even more preferably, the emulsion contains 0-2 wt. % of protein and most preferably 0-1 wt. % of protein. Proteins that may suitably be employed in the emulsion include dairy proteins (e.g. non-fat dry milk, sodium caseinate and milk protein isolate) and vegetable proteins (e.g. soy protein isolate), dairy proteins being preferred. In non-dairy toppings proteins are widely used to improve whippability as well as foam stability. Surprisingly, the emulsion of the present invention exhibit excellent whippability and foam stability even when no protein is contained in the emulsion.

The emulsion of the present invention may suitably contain non-proteinaceous emulsifier.

Examples of non-proteinaceous emulsifiers that can be employed include polysorbates (20, 40, 60, 65 & 80), sorbitan esters (Span 20, 40, 60, 65, 80, 85), polyglycerol esters of fatty acids, propylene glycol monostearate, propylene glycol monoesters, mono- and diglycerides of fatty acids, lactic acid esters of mono- and diglycerides of fatty acids, sucrose esters of fatty acids, sucroglycerides, sodium stearoyl lactylate and calcium stearoyl lactylate. Non-proteinaceous emulsifiers, notably emulsifiers having an HLB of 8 or more, are commonly used in whippable non-dairy creams to improve the whipping properties. The emulsion of the present invention, however, does not require addition of non-proteinaceous emulsifier to achieve excellent whipping properties. Typically, the emulsion contains 0-1 wt. %, more preferably 0-0.5 wt. % and more preferably 0-0.3 wt. % of non-proteinaceous emulsifier having an HLB of 8 or more. In accordance with a preferred embodiment, the present emulsion is in a viscous plastic state at 20° C. Plasticity ensures that the emulsion behaves similar to a solid shortening when making icing, for instance, in a whipping bowl or industrial sized mixing equipment. In another preferred embodiment the present emulsion is pourable at 20° C. Pourability allows the emulsion to be easily transferred from a container into, for instance, a whipping bowl or industrial sized mixing equipment.

The emulsion of the present invention is preferably packaged in a sealed container. Since the present invention enables the preparation of aeratable emulsions with very low water activity it is not necessary to pasteurize or sterilize the emulsion.

Another aspect of the invention relates to a method of preparing an icing or a filling, comprising combining 100 parts by weight of the base emulsion of the present invention with 100-500 parts, preferably 150-450, most preferably 200-350 parts by weight of sugar.

According to a particularly preferred embodiment, the sugar employed in the preparation of the icing or filling is powdered sugar.

According to a particularly preferred embodiment, the present method comprises creaming the combination of base emulsion and sugar to a specific gravity in the range of 0.65 to 0.95.

According to a particularly preferred embodiment, the present method is used to prepare buttercream.

The invention also relates to an icing or filling that is obtained by the aforementioned method.

Furthermore, the invention relates to a bakery product comprising the aforementioned icing of filling. Examples of such bakery products include cake, pie and confectionary. Preferably, the bakery product contains 0.1-30 wt. % of the icing or filling.

Yet another aspect of the invention relates to a method of preparing a topping, comprising mixing 100 parts by weight of the base emulsion of the present invention with 30-200 parts by weight, more preferably 40-120 parts by weight of syrup to produce a topping mixture, and whipping the mixture to a specific gravity in the range of 0.25 to 0.75.

The topping so produced typically has a water activity in the range of 0.80 to 0.95.

The invention also relates to a topping that is obtained by the aforementioned method. Furthermore, the invention relates to a bakery product comprising such topping. Examples of such bakery products include cake, pie and confectionary. Preferably, the bakery product contains 0.1-30 wt. % of the topping.

The invention is further illustrated by the following non-limiting examples.

EXAMPLES

Example 1

A base emulsion that can be used to prepare buttercream was prepared on the basis of the recipe shown in Table 1.

TABLE 1

| Ingredient | Wt. % |
| --- | --- |
| Fat [1] | 40.35 |
| Alpha-cyclodextrin [2] | 7.07 |
| High fructose corn syrup (42%) [3] | 28.57 |
| Low methoxyl pectin [4] | 0.95 |
| Sodium carboxymethyl cellulose [5] | 0.53 |
| Modified instant corn starch [6] | 0.71 |
| Sodium chloride | 0.34 |

TABLE 1-continued

| Ingredient | Wt. % |
| --- | --- |
| Potassium sorbate solution | 0.36 |
| Lactic acid (88%) | 0.10 |
| Water | 20.43 |
| Cream/vanilla flavour | 0.60 |

[1] Ultimate ® 92 (ex Cargill, USA), refined, bleached, hydrogenated and deodorized coconut oil; Iodine Value = 1.5, Mettler Dropping Point 94-100° F.
[2] Cavamax ® W6 (ex Wacker Biosolutions, Germany) - Water content is 11% max.
[3] IsoClear ® (ex Cargill, USA) - Water content is 29%
[4] GENU ® pectin type LM-22 CG (ex CPKelco, USA)
[5] Methocel ® (ex Dow, USA)
[6] Inscosity ® B656 pregelatinized modified starch (ex Grain Processing Corp., USA)

The base emulsion was prepared using the following procedure:
  Introduce the oil in a mixing bowl
  Place the high fructose corn syrup (HFCS) in a high shear blender, add the dry ingredients and blend for 1 minute at high speed.
  With the blender running, add liquid flavors and potassium sorbate solution and blend for 2 more minutes to produce a HFCS slurry.
  Introduce the water in a mixing vessel. Disperse alpha-cyclodextrin, salt and lactic acid into the water.
  Add the HFCS slurry to the aqueous cyclodextrin solution, bring the mixture to boil and boil for 2 minutes
  Add the boiled slurry to the mixing bowl with the oil.
  Allow the heated mixture to cool to 130° F., whip for 1 minute, cool to 110° F. and whip again for another minute.

Next, the base emulsion was used to prepare a buttercream on the basis of the recipe shown in Table 2.

TABLE 2

| Ingredient | Wt. % |
| --- | --- |
| Base emulsion | 19.61 |
| Powdered sugar | 58.82 |
| Water (chilled) | 5.88 |
| Shortening [1] | 15.69 |

[1] Sans trans ™ 39, palm oil fraction, Mettler dropping point of approximately 37-41° C. (ex Loders Croklaan)

The buttercream (1275 g) was prepared as follows in a Hobart 5 quart mixer:
  Mix base on speed 1 for 30 sec.
  Add ~50 g of sugar to base and stir to incorporate, about 30 sec
  Add the ice water slowly while mixing at speed 1, about a minute. Continue mixing at speed 1 for 30 sec to ensure that water is incorporated.
  Add the rest of the sugar and stir until completely combined on speed 1 for 2-2.5 minutes.
  Add the shortening in pieces and mix on speed 2 for 1 minute. Scrape down the bowl and mix for 2-3 minutes to desired specific gravity.

The buttercream so obtained had a water activity of 0.79 and a specific gravity of 0.91.

Example 2

A base emulsion that can be used to prepare buttercream was prepared in the same way and using the same ingredients as in Example 1. The emulsion was prepared on the basis of the recipe shown in Table 3.

TABLE 3

| Ingredient | Wt. % |
| --- | --- |
| Fat | 41.50 |
| Alpha-cyclodextrin | 4.43 |
| High fructose corn syrup (42%) | 29.38 |
| Low methoxyl pectin | 0.97 |
| Sodium carboxymethyl cellulose | 0.54 |
| Modified instant corn starch | 0.73 |
| Sodium chloride | 0.35 |
| Potassium sorbate solution | 0.37 |
| Lactic acid (88%) | 0.10 |
| Water | 21.01 |
| Cream/vanilla flavour | 0.62 |

A buttercream was prepared in the same way as in Example 1.
The buttercream so obtained had a water activity of 0.80 and a specific gravity of 0.86

Example 3

A base emulsion that can be used to prepare buttercream was prepared using the same ingredients as in Example 1, except that carboxymethyl cellulose was used instead of low methoxyl pectin. The emulsion was prepared on the basis of the recipe shown in Table 4.

TABLE 4

| Ingredient | Wt. % |
| --- | --- |
| Fat | 39.72 |
| Alpha-cyclodextrin | 8.48 |
| High fructose corn syrup (42%) | 28.12 |
| Carboxymethyl cellulose [1] | 0.98 |
| Sodium carboxymethyl cellulose | 0.52 |
| Modified instant corn starch | 0.70 |
| Sodium chloride | 0.33 |
| Potassium sorbate solution | 0.35 |
| Lactic acid (88%) | 0.09 |
| Water | 20.11 |
| Cream/vanilla flavour | 0.60 |

[1] CMC 15 F, cellulose gum (ex TIC Gums Inc., USA)

The base emulsion was prepared using the following procedure:
  Introduce the oil in a mixing bowl
  Place the high fructose corn syrup (HFCS) in a high shear blender, add the dry ingredients and blend for 1 minute at high speed
  With the blender running, add liquid flavors and potassium sorbate solution and blend for 2 more minutes to produce a HFCS slurry
  Add the HFCS slurry to the mixing bowl containing the oil
  Introduce the water in a mixing vessel. Disperse alpha-cyclodextrin, salt and lactic acid into the water and heat to 150° F.
  Add the cyclodextrin solution to the mixing bowl and mix A buttercream was prepared from the aforementioned base emulsion in the same way as in Example 1.
The buttercream so obtained had a water activity of 0.79 and a specific gravity of 0.81

Example 4

A base emulsion that can be used to prepare buttercream was prepared in the same way and using the same ingredients as in Example 3. The emulsion was prepared on the basis of the recipe shown in Table 5.

TABLE 5

| Ingredient | Wt. % |
| --- | --- |
| Fat | 41.85 |
| Alpha-cyclodextrin | 3.57 |
| High fructose corn syrup (42%) | 29.63 |
| Carboxymethyl cellulose | 1.03 |
| Sodium carboxymethyl cellulose | 0.55 |
| Modified instant corn starch | 0.74 |
| Sodium chloride | 0.35 |
| Potassium sorbate solution | 0.37 |
| Lactic acid (88%) | 0.10 |
| Water | 21.19 |
| Cream/vanilla flavour | 0.63 |

A buttercream was prepared in the same way as in Example 1.

The buttercream so obtained had a water activity of 0.81 and a specific gravity of 0.84

Example 5

A base emulsion that can be used to prepare whipped toppings was prepared on the basis of the recipe shown in Table 6.

TABLE 6

| Ingredient | Wt. % |
| --- | --- |
| Fat [1] | 40.02 |
| Alpha-cyclodextrin [2] | 14.41 |
| High fructose corn syrup[3] | 21.02 |
| Sodium carboxymethyl cellulose [4] | 0.66 |
| Lecithin [5] | 0.66 |
| Sodium chloride | 0.55 |
| Flavor | 0.66 |
| Water | 22.04 |

[1] Ultimate ® 92 (ex Cargill, USA), refined, bleached, hydrogenated and deodorized coconut oil; Iodine Value = 1.5, Mettler Dropping Point 94-100° F.
[2] Cavamax ® W6 (ex Wacker Biosolutions, Germany) - Water content is 11% max.
[3] IsoClear ® (ex Cargill, USA) - Water content is 29%
[4] Aquaion ® CMC-7HF (ex Ashland, USA)
[5] Yelkin Gold ® (ex ADM, USA)

The base emulsion was prepared using the following procedure:
CMC, salt and flavor were fully dispersed in HFCS using a blender, then heated until solution came to a boil.
In a mixing bowl, lecithin and alpha-cyclodextrin were dispersed in oil.
The HFCS mixture was poured into the oil mixture and mixed on speed 1 with a Hobart mixer (appr. 2 min.) until a thick paste formed. The specific gravity of the base emulsion was 0.951.

Next, the base emulsion was used to prepare a whipped topping on the basis of the recipe shown in Table 7.

TABLE 7

| Ingredient | Wt. % |
| --- | --- |
| Base emulsion | 50.0 |
| Corn syrup[1] | 33.0 |
| Corn starch[2] | 1.0 |
| Water | 16.0 |

[1] C Sweet ™ M 01612 (ex Cargill, USA)
[2] OptaMist ® 364 (ex JRS, USA)

The whipped topping (1000 g) was prepared as follows in a Hobart 5 (Model N-50) quart mixer:
Base emulsion, corn starch and corn syrup were mixed on speed 1 for 1 min with a standard paddle attachment.
Hot water (appr. 155° F.) was mixed into the base emulsion-syrup mixture on speed 1 with a Wire Whip D whisk attachment for appr. 2 min.
Whipping speed was increased to speed 2 for 1 min.
Whipping speed was increased to speed 3 (appr. 1 min.) until desired specific gravity.

The whipped topping so obtained had a water activity of 0.911 and a specific gravity of 0.47.

The invention claimed is:

1. A method of preparing an icing or a filling, comprising:
   (a) combining 100 parts by weight of an emulsion with 100-500 parts by weight of sugar, having an aqueous phase and an oil phase, and comprising:
      (i) 15-40 wt. % water;
      (ii) 30-60 wt. % oil;
      (iii) 1.5-18 wt. % of cyclodextrin selected from alpha-cyclodextrin, beta-cyclodextrin and combinations thereof; and
      (iv) 12-50 wt. % of saccharides selected from monosaccharides, disaccharides, non-cyclic oligosaccharides, sugar alcohols and combinations thereof; and
   (b) creaming the combination of emulsion and sugar to a specific gravity in the range of 0.65 to 0.95.

2. The method according to claim 1, wherein the sugar is powdered sugar.

3. The method according to claim 1, further comprising combining 100 parts by weight of the oil-in-water emulsion with 150-450 parts by weight of sugar.

4. The method according to claim 1, wherein the icing or filling is buttercream.

5. An icing or filling obtained by a method according to claim 1.

6. A bakery product comprising an icing or filling according to claim 5.

7. The method according to claim 1, wherein the emulsion contains 18-36 wt. % water.

8. The method according to claim 1, wherein the emulsion contains 35-55 wt. % oil.

9. The method according to claim 1, wherein the oil has a solid fat content at 20° C. ($N_{20}$) of less than 20%.

10. The method according to claim 1, wherein the cyclodextrin is alpha-cyclodextrin.

11. The method according to claim 1, wherein the emulsion contains 15-40 wt. % saccharides.

12. The method according to claim 1, wherein the emulsion contains at least 12 wt. % monosaccharides.

13. The method according to claim 1, wherein the emulsion contains at least 60% monosaccharides by weight of the saccharides.

14. A method of preparing a topping, comprising:
   (a) mixing 100 parts by weight of an oil-in-water emulsion with 30-200 parts by weight of syrup to produce a topping mixture, and
   (b) whipping the mixture to a specific gravity in the range of 0.25 to 0.75,
   wherein the oil-in-water emulsion has an aqueous phase and an oil phase and comprises:
      (i) 15-40 wt. % water,
      (ii) 30-60 wt. % oil;
      (iii) 1.5-18 wt. % of cyclodextrin selected from alpha-cyclodextrin, beta-cyclodextrin and combinations thereof; and
      (iv) 12-50 wt. % of saccharides selected from monosaccharides, disaccharides, non-cyclic oligosaccharides, sugar alcohols and combinations thereof.

15. The method according to claim 14, wherein the topping has a water activity in the range of 0.80 to 0.95.

16. A topping obtained by a method according to claim 14.

17. A bakery product comprising a topping according to claim 16.

18. The method according to claim 14, wherein the emulsion contains 18-36 wt. % water.

19. The method according to claim 14, wherein the emulsion contains 35-55 wt. % oil.

20. The method according to claim 14, wherein the oil has a solid fat content at 20° C. ($N_{20}$) of less than 20%.

21. The method according to claim 14, wherein the cyclodextrin is alpha-cyclodextrin.

22. The method according to claim 14, wherein the emulsion contains 15-40 wt. % saccharides.

23. The method according to claim 14, wherein the emulsion contains at least 12 wt. % monosaccharides.

24. The method according to claim 14, wherein the emulsion contains at least 60% monosaccharides by weight of the saccharides.

\* \* \* \* \*